United States Patent [19]
MacDonald et al.

[11] Patent Number: 5,894,577
[45] Date of Patent: Apr. 13, 1999

[54] INTERRUPT CONTROLLER WITH EXTERNAL IN-SERVICE INDICATION FOR POWER MANAGEMENT WITHIN A COMPUTER SYSTEM

[75] Inventors: James R MacDonald, Buda; Douglas D. Gephardt; Dan S. Mudgett, both of Austin, all of Tex.

[73] Assignee: Advanced Micro Devices, Inc., Sunnyvale, Calif.

[21] Appl. No.: 08/125,336

[22] Filed: Sep. 22, 1993

[51] Int. Cl.$^6$ .............................. G06F 9/46; G06F 1/32
[52] U.S. Cl. ........................ 395/733; 395/736; 395/737; 395/750.04
[58] Field of Search ..................... 395/725, 325, 395/275, 800, 750, 733, 736, 737, 750.04; 364/707

[56] References Cited

U.S. PATENT DOCUMENTS

| | | | |
|---|---|---|---|
| 3,905,025 | 9/1975 | Davis et al. | 395/725 |
| 4,615,005 | 9/1986 | Maejima | 395/550 |
| 4,851,987 | 7/1989 | Day | 395/550 |
| 5,101,497 | 3/1992 | Culley et al. | 395/725 |
| 5,167,024 | 11/1992 | Smith et al. | 395/375 |
| 5,214,767 | 5/1993 | Wannet et al. | 385/425 |
| 5,218,703 | 6/1993 | Fleck et al. | 395/725 |
| 5,237,692 | 8/1993 | Raasch et al. | 395/725 |
| 5,283,904 | 2/1994 | Carson et al. | 395/725 |
| 5,349,667 | 9/1994 | Kaneko et al. | 395/725 |
| 5,392,435 | 2/1995 | Masui et al. | 395/725 |
| 5,410,708 | 4/1995 | Miyamori | 395/725 |

FOREIGN PATENT DOCUMENTS

| | | | |
|---|---|---|---|
| 0358330A1 | 3/1990 | European Pat. Off. | G06F 13/24 |
| 0421431A2 | 10/1990 | European Pat. Off. | G06F 1/32 |
| 2235797 | 3/1991 | United Kingdom | G06F 1/32 |

*Primary Examiner*—Gopal C. Ray
*Attorney, Agent, or Firm*—Conley, Rose & Tayon, PC; B. Noel Kivlin

[57] ABSTRACT

An interrupt controller includes an interrupt request register for receiving interrupt requests from various peripherals or I/O devices via a set of request lines. A priority resolver is further provided for comparing the priority level of the interrupt lines, latching the lower priority requests in a stand-by mode, and directing servicing of the highest priority level. An in-service register is provided for storing the identification of any request line that is being serviced by the microprocessor. In one embodiment, a set of signal lines are coupled between the in-service register and external terminals of the integrated circuit on which the interrupt controller is fabricated. A power management unit may be coupled to the external pins of the integrated circuit and thereby receives real-time information regarding an interrupt request that is currently being serviced and regarding interrupt service routines that have completed. Using this information, the power management unit advantageously stops unused clock signals and/or removes power from inactive circuit portions when an interrupt routine completes without having to estimate the time of completion. By accurately stopping unused clock signals and removing power, a reduction in the overall power consumption of the computer system can be attained.

18 Claims, 2 Drawing Sheets

5,894,577

INTERRUPT CONTROLLER WITH EXTERNAL IN-SERVICE INDICATION FOR POWER MANAGEMENT WITHIN A COMPUTER SYSTEM

BACKGROUND OF THE INVENTION

1. Field of the Invention

This invention relates to computer systems and more particularly to interrupt controllers and power management within computer systems.

2. Background of the Relevant Art

An on-going developmental goal of manufacturers has been to reduce the power consumption of computer systems. Reducing power consumption typically reduces heat generation of the system, thereby increasing reliability and decreasing cost. In addition, power reduction has been particularly important in maximizing the operating life of battery-powered portable computer systems.

Various techniques have been devised for reducing the power consumption of computer systems. These techniques include increasing the integration of circuitry and incorporation of improved circuitry and power management units (PMU's). One specific power reduction technique involves the capability of stopping (or reducing the frequency of) clock signals that drive inactive circuit portions. A system employing such a technique typically includes a power management unit that detects or predicts inactive circuit portions and accordingly stops the clock signals associated with the inactive circuit portions. By turning off "unused" clock signals that drive inactive circuit portions, overall power consumption of the system is decreased. A similar technique involves removing the power supplied to inactive circuit portions.

The power management techniques of stopping unused clock signals and/or removing power from inactive circuit portions as described above are frequently employed within interrupt driven systems. In an interrupt driven system, peripheral and I/O devices such as keyboards, displays, timers, sensors and other components execute certain tasks independently of the central source or microprocessor, but require communication with the microprocessor at irregular, random and therefore asynchronous intervals. In such systems, a particular peripheral or I/O device generates an interrupt signal which is passed on to the microprocessor via a dedicated interrupt line or channel to request that the microprocessor interrupt its processing and communicate with the particular peripheral or I/O device. Upon detecting an active interrupt request, the microprocessor transfers control to service the particular request.

A microprocessor typically services many peripheral devices over a single input-output channel which can only be utilized by one peripheral at a time. Consequently, a priority is assigned to the various peripheral devices to discriminate between concurrent interrupt requests to service the most urgent before the others. Conventional systems have dealt with the problem of multiple interrupt sources by providing an interface circuit between the microprocessor and the peripherals to centrally sort, prioritize and control the interrupt sequencing. One such circuit is the 8259A series programmable interrupt controller manufactured by Advanced Micro Devices, Inc. and described in the publication "MOS Microprocessors and Peripherals"; pp. 3-371 through 3-388 (Advanced Micro Devices, Inc. 1987). This publication is incorporated herein by reference in its entirety.

Most interrupt controllers handle interrupt requests from eight or more peripherals or I/O devices. Each interrupt source is provided an interrupt service routine at a specified vectoral address for servicing the interrupt request. Each interrupt source has its own interrupt request line, and programmable controllers such as the 8259A allow for identification and prioritization of the various sources upon system initialization. In typical operation, the interrupt controller recognizes interrupt requests and passes the highest priority request to the microprocessor, while holding lower priority requests until the processor has completed servicing the interrupt in progress.

When a power management unit within an interrupt driven system including an interrupt controller has stopped the clock signals associated with, for example, the microprocessor, the memory subsystems, and/or other inactive peripherals, the power management unit typically monitors the interrupt request lines. If an interrupt request signal is detected, the power management unit re-starts the clock signals of the microprocessor and other peripheral components to thereby allow execution of the interrupt service routine. Since the power management unit is typically unaware of when a particular interrupt service routine has completed in such systems, the power management unit is programmed to re-stop the clock signals after an estimated period of time has elapsed. To ensure that the interrupt service routine has ample time to complete before the clock is re-stopped, the power management unit usually keeps the associated clock signals on substantially beyond the time at which the interrupt routine actually completes. In such a system, however, power is wasted when the clock signal is driven beyond the actual time of servicing the interrupt. A similar consideration applies to a situation in which the power management unit has removed power from a particular circuit portion.

SUMMARY OF THE INVENTION

The problems outlined above are in large part solved by an interrupt controller with an external in-service indication according to the present invention. The interrupt controller includes an interrupt request register for receiving interrupt requests from various peripherals or I/O devices via a set of request lines. A priority resolver is further provided for comparing the priority level of the interrupt lines, latching the lower priority requests in a stand-by mode, and directing servicing of the highest priority level. An in-service register is provided for storing the identification of any request line that is being serviced by the microprocessor. In one embodiment, a set of signal lines are coupled between the in-service register and external terminals of the integrated circuit on which the interrupt controller is fabricated. A power management unit is coupled to the external pins of the integrated circuit and thereby receives real-time information regarding an interrupt request that is currently being serviced and regarding interrupt service routines that have completed. Using this information, the power management unit advantageously stops unused clock signals and/or removes power from inactive circuit portions when an interrupt routine completes without having to estimate the time of completion. By accurately stopping unused clock signals and removing power, a reduction in the overall power consumption of the computer system can be attained.

Broadly speaking, the present invention contemplates a computer system comprising a peripheral device capable of asserting an interrupt request signal and an interrupt controller including at least one interrupt request line for receiving the interrupt request signal. The interrupt controller includes a control circuit capable of generating a microprocessor interrupt signal in response to the assertion of the interrupt request signal and an in-service register for storing data indicative of whether a particular interrupt request is currently being serviced by a microprocessor. A power management unit is coupled to an output line of the in-service register, wherein the power management unit controls a clock signal or the power provided to a computer subsystem depending upon the data stored within the in-service register.

The present invention further contemplates an interrupt controller fabricated on an integrated circuit chip comprising an interrupt request register for receiving a plurality of interrupt request signals from a plurality of peripheral devices. A priority resolver circuit is coupled to the interrupt request register for directing the servicing of a highest priority interrupt request signal. A control circuit is further provided for generating a microprocessor interrupt signal in response to the highest priority interrupt request signal and for receiving an acknowledge signal from a microprocessor. An in-service register is coupled to the control circuit for storing data indicative of whether any of the interrupt request signals are currently being serviced by the microprocessor. An output terminal is coupled to an output line of the in-service register, wherein the output terminal is capable of being connected to devices that are external to the integrated circuit.

BRIEF DESCRIPTION OF THE DRAWINGS

Other objects and advantages of the invention will become apparent upon reading the following detailed description and upon reference to the accompanying drawings in which.

Figure 1:
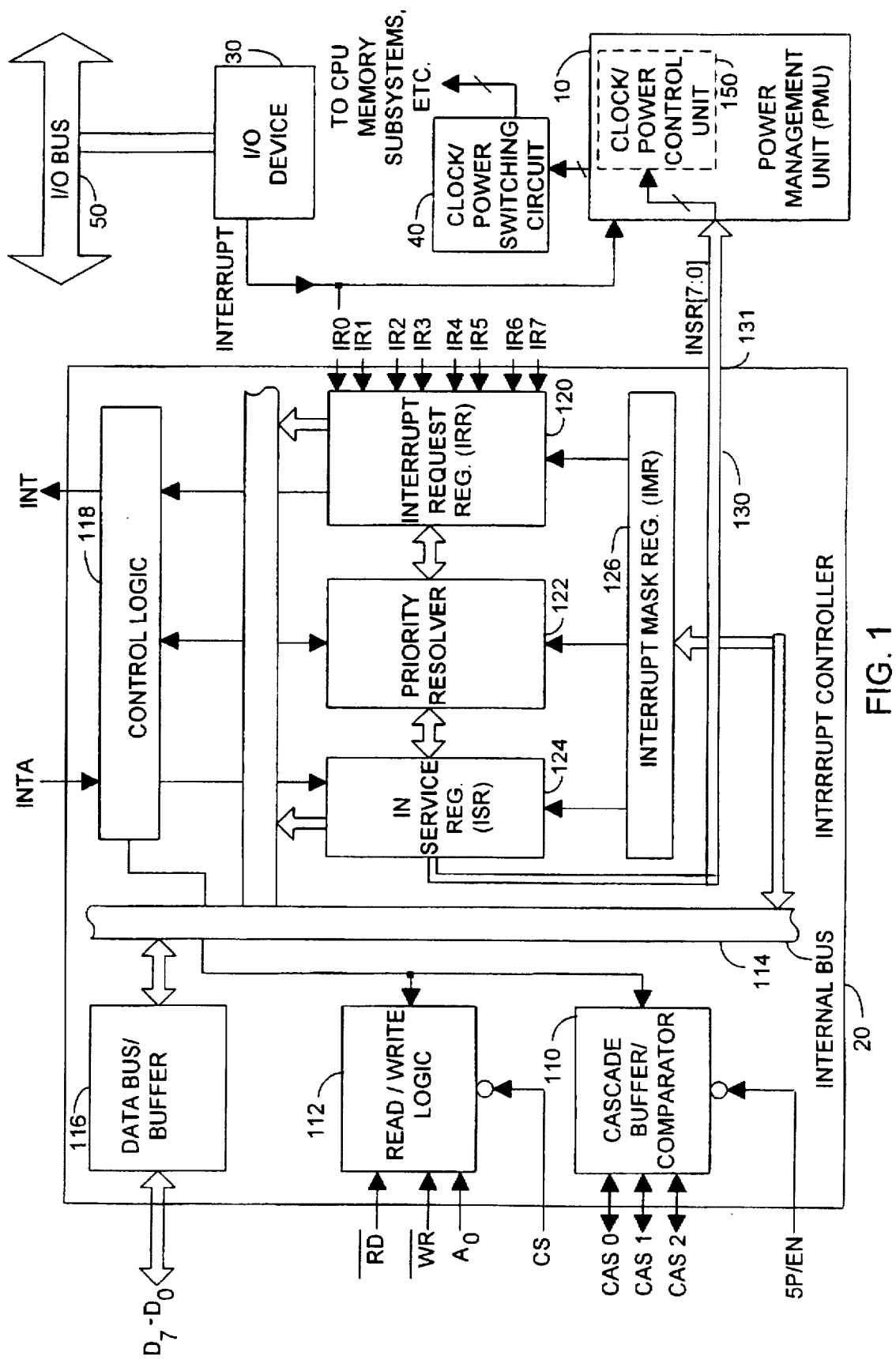
FIG. 1 is a block diagram that illustrates an interrupt controller coupled to a power management unit in accordance with the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Referring now to the drawings, FIG. 1 is a block diagram of a portion of a computer system including a power management unit 10 coupled to an interrupt controller 20. An I/O device 30 and a clock/power switching circuit 40 are further shown coupled to interrupt controller 20 and power management unit 10, respectively.

Interrupt controller 20 includes a cascade buffer/comparator 110, a read/write logic circuit 112 and a data bus buffer circuit 116. Interrupt controller 20 further includes a control logic circuit 118, an interrupt request register 120, a priority resolver 122, an in-service register 124, and an interrupt mask register 126. These circuit portions will be described in greater detail below.

Interrupt controller 20 interfaces between a central processor (not shown) and one or more peripheral devices, (such as I/O device 30) which generate interrupt signals to indicate a need for servicing by the processor. The interrupt controller 20 is attached to the central processor as an input/output peripheral. Various parameters of the interrupt controller 20 such as the priority levels, interrupt signal mode, etc. may be programmed by the user to suit the particular needs of the system. The details of such programming are well-known to those skilled in the art.

Interrupt request signals from peripheral devices are received on interrupt request lines $IR_0$–$IR_7$. It should be understood that while the interrupt controller of FIG. 1 is configured to receive interrupts from eight sources, multiple interrupt controllers can be cascaded to operate in a master/slave relationship via cascade buffer/comparator 110 in the same manner as the prior art 8259A controller. A single interrupt controller circuit is shown and described herein in the interest of clarity.

Interrupt controller 20 connects to the processor as follows. The $\overline{CS}$ pin is a chip select input which when enabled (low) enables the read/write logic circuit 112 to permit communication between the interrupt controller 20 and the processor through a bidirectional internal bus 114, through the data bus buffer circuit 116 and through a bidirectional system data bus ($D_7$–$D_0$).

The write ($\overline{WR}$) input to read/write logic circuit 112, when enabled, permits the controller 20 to accept programming instructions from the processor. These instructions will include operating command words which set various parameters for operation of the controller 20. Enabling the read ($\overline{RD}$) input of read/write logic circuit 112 permits the processor to obtain data indicative of the status of controller 20, including the status of the parameters set in the initialization sequence. The $A_0$ address line in conjunction with the $\overline{WR}$, $\overline{CS}$ and $\overline{RD}$ lines of logic circuit 112 accommodate the decoding of various command words from the processor and status requests from the processor.

Data bus buffer circuit 116 is a bidirectional bus interface which permits transfer of control, status and interrupt address data between the controller 20 and the processor. The interrupt address data includes vectored pointers which identify the addresses in processor readable memory where the interrupt service routines for the particular peripheral devices are stored.

Control logic circuit 118 controls the transmittal of interrupt requests to the processor via the interrupt line (INT) and receives interrupt acknowledge signals from the processor via the interrupt acknowledge line (INTA).

In operation, when a valid interrupt request is asserted by a peripheral device, controller 20 causes an interrupt signal to be placed on output pin INT which is typically connected to the processor's interrupt input terminal. After receipt of an interrupt request via the INT line, the processor generates an interrupt acknowledge signal which is passed to control logic circuit 118 via the INTA line. An enabling signal on the INTA line causes the control logic circuit 118 to write the vectored address of the appropriate interrupt service routine to the data bus via buffer 116.

As stated previously, interrupt requests from the various peripherals are received via request lines $IR_0$–$IR_7$. These are asynchronous requests. Interrupt request register 120 receives and stores the identity of any interrupt line $IR_0$–$IR_7$ which is requesting an interrupt.

Interrupt request register 120 is connected in a cascade configuration to priority resolver 122. Priority resolver 122 is a logic circuit which compares the priority levels (programmed by the user) of the interrupt lines requesting service to those in service, latches the lower priority requests in a standby mode, and directs servicing of the highest priority interrupt.

The outputs of the priority resolver 122 are connected to the in-service register 124. In-service register 124 stores the identification of any request line that is being serviced by the processor.

Where the user desires to prevent one or more interrupt lines from being serviced either temporarily or on a more prolonged basis, a mask bit may be set that corresponds to that interrupt line. These mask bits are stored in interrupt mask register 126. Interrupt mask register 126 is configured to disable one or more interrupt request lines within interrupt request register 120. Interrupt mask register 126 is a readable/writable register in bidirectional communication with the processor via internal bus 114 and data bus buffer circuit 116.

Further details regarding various circuit blocks within portions of interrupt controller 20 are described in, for example, the Advanced Micro Devices publication "MOS Microprocessors and Peripherals" and within U.S. Pat. No. 5,101,497 issued Mar. 31, 1992 to Culley et al. This patent is incorporated herein by reference in its entirety.

In accordance with the invention, interrupt controller 20 is further configured with a bus 130 coupled to in-service register 124 for providing to externally connected devices the identification of any request line that is currently being serviced by the processor. In the embodiment shown, power management unit 10 is connected to bus 130 at a set of terminals 131 of the interrupt controller 20. It is noted that the interrupt controller 20 is fabricated on an integrated circuit chip and that the set of terminals 131 are external pins of the integrated circuit chip. As will be explained in further detail below, power management unit 10 uses the information from in-service register 124 to control the re-stopping of various clock signals or to control the removal of power from inactive circuit portions for power management.

Power management unit 10 is configured to manage the overall power consumed by the computer system. For example, power management unit 10 may reduce power consumption by turning off unused clock signals that normally drive the microprocessor (CPU), memory subsystems, and/or peripheral devices. Power management unit 10 may similarly be configured to remove the power supply from various subsystems that are inactive. In such configurations, the power management unit 10 monitors the interrupt request lines IR$_0$–IR$_7$ and causes the clock signals to re-start and/or the power to be re-applied to the necessary subsystems (i.e., CPU, system memory, etc.) when an interrupt request signal is asserted. The power management unit 10 causes the clock signals to re-start and/or power to be re-applied by providing appropriate control signals to the clock/power switching circuit 40. Once the clock signals have been restarted and/or power has been re-applied, execution of the interrupt service routine can be carried out. These power management functions are well known to those skilled in the art and are described in a host of publications of the known prior art. For example, one such power management unit that includes a software routine for continually monitoring various subsystems of the computer system and for removing the power and/or clock signals from inactive subsystems is described within U.S. Pat. No. 5,167,024 issued Nov. 24, 1992 to Smith et al. This patent is incorporated herein by reference in its entirety.

In addition to the circuitry (and, in some implementations, the software) that accommodates the functions described above, power management unit 10 also includes a clock/power control unit 150 coupled to clock/power switching circuit 40. The clock/power control unit 150 is connected to bus 130 and receives the status information within in-service register 124 that indicates whether any interrupt request is currently being serviced by the microprocessor. As stated previously, if any interrupt request is currently being serviced by the microprocessor, a corresponding bit within in-service register 124 will be set. The clock/power control unit 150 of power management unit 10 receives this asserted bit through bus 130 and accordingly provides a control signal to clock/power switching unit 40. This control signal causes the clock/power switching circuit 40 to continue providing the clock signals and power to, for example, the CPU and various subsystems. Thus, while a particular interrupt is being serviced and a corresponding bit of in-service register 124 is set, clock/power control unit 150 ensures that the clock signals are not re-stopped and that power to the various subsystems is not removed by power management unit 10.

After all the interrupt requests have been serviced by the microprocessor, each bit within in-service register 124 will be cleared. The clock/power control unit 150 of power management unit 10 senses this condition through bus 130 and accordingly provides a control signal to clock/power switching circuit 40 that causes, for example, the clock signals to be stopped and/or power to be removed from the various subsystems. In one embodiment, this may be accomplished by incorporating an OR gate within clock/power control unit 150 with the inputs of the OR gate coupled directly to bus 130 and the output of the OR gate coupled directly to the clock/power switching circuit 40. The power management unit 10 could alternatively be programmed to stop the clock signals and/or remove the power following a predetermined delay after the bits within in-service register 124 have all cleared. Depending upon the system design and the desired power management scheme, power management unit 10 may be programmed with any other appropriate algorithm to re-stop the clock signals and/or remove power after the clock/power control unit 150 has sensed the cleared state of in-service register 124. For example, if a routine being serviced by the microprocessor is the result of an interrupt request initiated by a keyboard, the designer may choose to program the power management unit 10 to provide a predetermined delay after the in-service register 124 has cleared before re-stopping clock signals and/or removing power since there is a probability that continued system activity will subsequently occur.

Figure 2:
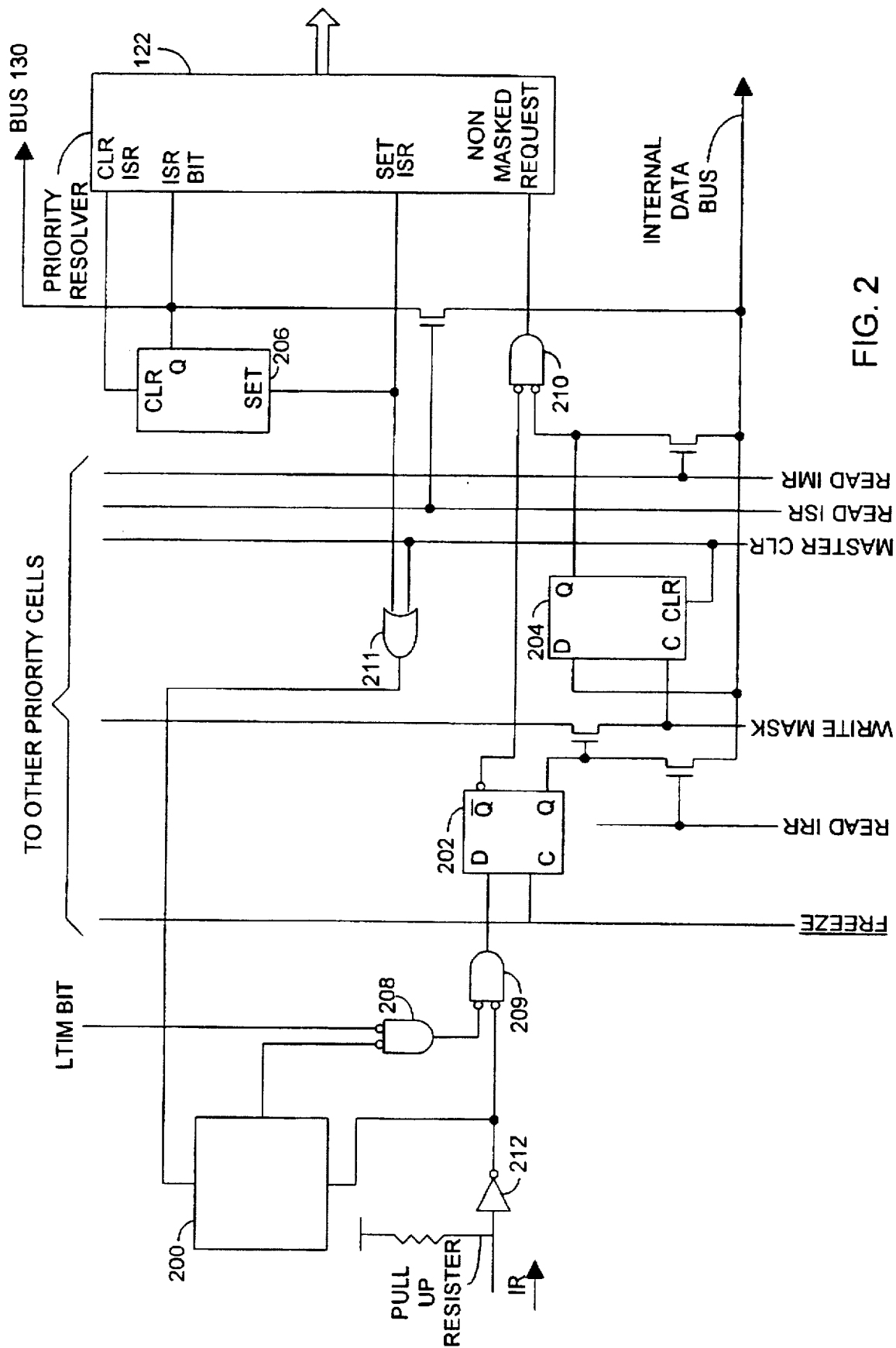
FIG. 2 is a schematic diagram that illustrates a portion of an interrupt controller.

FIG. 2 is a schematic diagram that illustrates a portion of the internal circuitry incorporated within interrupt controller 20. It should be understood that the portion of the internal circuitry shown essentially represents one logic cell of interrupt request register 120 and of in-service register 124 which is duplicated within the interrupt controller for each interrupt request line IR$_0$–IR$_7$. For the sake of clarity, the operation of the circuit is described as it pertains to a single interrupt request line with the understanding that one of ordinary skill in the art could add the requisite number of duplicate circuit elements to service the required number of interrupt request lines.

The circuit of FIG. 2 includes an edge sense latch 200, a request latch 202, a mask latch 204, and an in-service latch 206. Also shown are NOR gates 208–210, OR gate 211, and inverter 212. Request latch 202 is a latch within the interrupt request register 120. A logic high at the D input of latch 202 produces a logic low at the Q output which satisfies half of the input condition for NOR gate 210. The second input condition is satisfied unless the interrupt has been masked (disabled) via mask latch 204. Mask latch 204 is a D-type latch which forms part of interrupt mask register 26. The interrupt request is then passed to the priority resolver 122 for transmittal to the control logic 118 after resolving conflicts. When the interrupt request is passed to the control logic 118, its INT output is enabled thereby communicating the interrupt request to the processor. When the interrupt request is acknowledged by the processor via the interrupt acknowledge signal (INTA), the in-service bit is set, which sets in-service latch 206. This signal also enables OR gate 211 which clears edge sense latch 200 to reinitialize the circuit to receive the next interrupt. The output of in-service latch 206 is coupled to one of the bit lines of bus 130.

Numerous variations and modifications will become apparent to those skilled in the art once the above disclosure is fully appreciated. For example, although the bus 130 of FIG. 1 connects each status bit of in-service register 124 to the terminals 131, two or more of the status bits within in-service register 124 may be logically ORed within the interrupt controller 20 to reduce the pin-count of the interrupt controller 20. Furthermore, although the interrupt controller 20 and power management 10 are illustrated as separate units, interrupt controller 20 and power management unit 10 could be incorporated on a common integrated circuit chip, thereby eliminating the external pins that connect to bus 130. It is intended that the following claims be interpreted to embrace all such variations and modifications.

What is claimed is:

1. A computer system comprising:
    a peripheral device capable of asserting an interrupt request signal;
    an interrupt controller including at least one interrupt request line for receiving said interrupt request signal, wherein said interrupt controller includes a control circuit capable of generating a microprocessor interrupt signal in response to the assertion of said interrupt request signal, and wherein said interrupt controller further includes an in-service register for storing data indicative of whether a particular interrupt request is currently being serviced by a microprocessor; and
    a power management unit coupled to an output line of said in-service register, wherein said power management unit controls the frequency of a clock signal depending upon the data stored within said in-service register.

2. The computer system as recited in claim 1 wherein said interrupt controller further comprises:
    a plurality of additional interrupt request lines for receiving a plurality of interrupt request signals; and
    an interrupt request register coupled to said plurality of interrupt request lines for receiving and storing the identity of any said plurality of interrupt lines which is requesting an interrupt.

3. The computer system as recited in claim 2 wherein said interrupt request register is further coupled to a priority resolver circuit for prioritizing said plurality of interrupt signals.

4. The computer system as recited in claim 1 wherein said control circuit is capable of receiving an acknowledge signal from said microprocessor, wherein the data stored within said in-service register is controlled by said acknowledge signal.

5. The computer system as recited in claim 1 wherein said power management unit controls the stopping of said clock signal depending upon the data stored within said in-service register.

6. The computer system as recited in claim 5 wherein said power management unit stops said clock signal only if no interrupt requests are being serviced by said microprocessor.

7. The computer system as recited in claim 1 wherein said clock signal is provided to clock said microprocessor.

8. The computer system as recited in claim 1 wherein said clock signal is provided to clock a computer subsystem.

9. A computer system comprising:
    a peripheral device capable of asserting an interrupt request signal;
    an interrupt controller including at least one interrupt request line for receiving said interrupt request signal, wherein said interrupt controller includes a priority control circuit capable of generating a microprocessor interrupt signal in response to the assertion of said interrupt request signal, and wherein said interrupt controller further includes an in-service register for storing data indicative of whether a particular interrupt request is currently being serviced by a microprocessor; and
    a power management unit coupled to an output line of said in-service register, wherein said power management unit controls the amount of power supplied to a computer subsystem depending upon the data stored within said in-service register.

10. The computer system as recited in claim 9 wherein said interrupt controller further comprises:
    a plurality of additional interrupt request lines for receiving a plurality of interrupt request signals; and
    an interrupt request register coupled to said plurality of interrupt request lines for receiving and storing the identity of any said plurality of interrupt lines which is requesting an interrupt.

11. The computer system as recited in claim 10 wherein said interrupt request register is further coupled to a priority resolver circuit for prioritizing said plurality of interrupt signals.

12. The computer system as recited in claim 9 wherein said control circuit is capable of receiving an acknowledge signal from said microprocessor, wherein the data stored within said in-service register is controlled by said acknowledge signal.

13. The computer system as recited in claim 9 wherein said power management unit causes power to be removed from said computer subsystem depending upon the data stored within said in-service register.

14. The computer system as recited in claim 13 wherein said power management unit causes power to be removed from said computer subsystem only if no interrupt requests are being serviced by said microprocessor.

15. An interrupt controller fabricated on an integrated circuit chip, comprising:
    an interrupt request register for receiving a plurality of interrupt request signals from a plurality of peripheral devices;
    a priority resolver circuit coupled to said interrupt request register for directing the servicing of a highest priority interrupt request signal;
    a control circuit for generating a microprocessor interrupt signal in response to said highest priority interrupt request signal, wherein said control circuit is configured to receive an acknowledge signal generated by a microprocessor;
    an in-service register coupled to said control circuit for storing data indicative of whether any of said interrupt request signals are currently being serviced by said microprocessor; and an output terminal coupled to an output line of said in-service register, wherein said output terminal is configured to be connected to devices that are external to said integrated circuit.

16. The interrupt controller as recited in claim 15 wherein said output terminal provides a signal indicative of whether any of said interrupt request signals are currently being serviced by said microprocessor.

17. The interrupt controller as recited in claim 15 wherein a second output terminal is coupled to a second output line of said in-service register, wherein said second output terminal is capable of being connected to devices that are external to said integrated circuit.

18. The interrupt controller as recited in claim 15 wherein said in-service register includes at least one latch, wherein said latch is set if one of said interrupt request signals is being serviced by a microprocessor and wherein said latch is cleared if said one of said interrupt request signals is not being serviced by said microprocessor.

* * * * *